United States Patent [19]

Iwaoka et al.

[11] 4,091,427
[45] May 23, 1978

[54] ELECTRIC CONTROL SYSTEM FOR MAGNETIC SHEET RECORDING AND REPRODUCING APPARATUS FOR AUDIOVISUAL INSTRUCTION

[75] Inventors: Masao Iwaoka; Yosuke Igeta; Toyochika Kiku; Fumio Kobayashi; Tatsuhiko Sugai, all of Tokyo, Japan

[73] Assignee: Gakken Co., Ltd., Tokyo, Japan

[21] Appl. No.: 618,898

[22] Filed: Oct. 2, 1975

[30] Foreign Application Priority Data

Mar. 8, 1975 Japan ................................. 50-27610

[51] Int. Cl.² .............................................. G11B 21/02
[52] U.S. Cl. ....................................... 360/101; 360/75
[58] Field of Search .................... 360/75, 101, 2, 106, 360/74; 35/35 C

[56] References Cited

U.S. PATENT DOCUMENTS 3,046,357  7/1962  Fujimoto .............................. 360/101
3,727,921  4/1973  Kato ..................................... 360/101

*Primary Examiner*—Robert S. Tupper
*Attorney, Agent, or Firm*—Irving M. Weiner; Pamela S. Austin

[57] ABSTRACT

Recording-reproducing apparatus utilizing as the recording medium a rectangular sheet of paper or the like having a spiral magnetic track on one surface and printed material on the opposite surface for audiovisual educational purposes. For electrically controlling the operation of the apparatus, switches for playback, recording, stop and backspacing operations are connected to a reversible drive motor via a control circuit comprising a relay with a plurality of relay contact sets. The control circuit includes means for automatically suspending the rotation of the drive motor in response to a stop signal generated when, during playback, the magnetic head reaches a specific zone or zones on the track.

9 Claims, 4 Drawing Figures

ELECTRIC CONTROL SYSTEM FOR MAGNETIC SHEET RECORDING AND REPRODUCING APPARATUS FOR AUDIOVISUAL INSTRUCTION

BACKGROUND OF THE INVENTION

This invention relates generally to teaching apparatus, and in particular to magnetic recording and reproducing apparatus wherein the recording medium takes the form of a sheet of paper or other material with a spiral magnetic track formed on one surface and with characters, pictures, tables or the like printed on the opposite surface for visual presentation of the subject of audio information prerecorded on the track. Even more particularly, the invention deals with an electric control system for such audiovisual teaching apparatus.

In audiovisual teaching machines of the above described character, the sheet of paper or like material (hereinafter referred to as the magnetic sheet) is fixedly mounted in position on the machine, with its track-bearing surface directed downwardly, and a magnetic recording-reproducing head is moved along the spiral track for playback or recording. It has been common with this type of machines to employ mechanical controls comprising levers, links and a variety of other mechanical elements for causing the machine to perform such functions as playback, recording, stop and backspacing. The machines incorporating such mechanical controls are inevitably bulky, heavy, and expensive of manufacture.

These deficiencies of the prior art are not to be overlooked because the machines are intended primarily for children of both school and preschool ages. Another serious defect is that the actuation of the conventional mechanical controls requires considerable manual effort, which sometimes exceeds the normal capability of preschoolers in particular. Furthermore, unpleasant noise is produced upon actuation of the mechanical controls, and they are highly susceptible to troubles with the repeated use of the machine.

SUMMARY OF THE INVENTION

In view of the listed disadvantages of the prior art it is a principal object of this invention to provide an electric control system designed to enhance the utility of magnetic sheet recording and reproducing apparatus of the character in question.

Another object of the invention is to provide an electric control system whereby the various operations of the apparatus such as recording and playback can be controlled by finger actuable switches, as of pushbutton type, through thoroughly electrical means, so that school-agers and preschoolers alike can easily take full command of the apparatus.

A further object of the invention is to provide an electric control system which, when incorporated with the magnetic sheet recording and reproducing apparatus, is effective to make the same highly compact, light in weight, and reliable in operation.

A still further object of the invention is to make possible the centralized control by a teacher or instructor of a number of such electrically controlled devices in classroom study or group study of a common subject matter.

Briefly stated, this invention contemplates the provision of an electric control system for magnetic sheet recording and reproducing apparatus, comprising first switch means for setting the drive motor of the apparatus in rotation in one (or forward) direction, and second switch means for terminating the drive motor rotation. Upon actuation of the first switch means a relay is energized and held energized by a holding circuit, with the holding circuit being opened to de-energize the relay upon actuation of the second switch means. The drive motor is set in rotation by being fed from electric input means via relay contact means upon energization of the relay, and is set out of rotation upon de-energization of the relay.

The first switch means usually comprises a playback switch and a recording switch which are to be actuated singly or altogether to cause the apparatus to perform the playback or recording operation. The selection between the playback and recording modes of the apparatus can also be accomplished electrically by means of a separate selector switch.

If desired, third switch means can be provided for backspacing purposes, that is, to enable the student to "listen back" conveniently to selected portions of the prerecorded audio information. According to a preferred embodiment of the invention the drive motor can be caused to rotate in an opposite (or reverse) direction via the relay contact means only during actuation of the third switch means.

According to a feature of this invention there is provided an automatic stop signal generator circuit which produces a stop signal in response to an input signal of a predetermined frequency. This input signal is supplied when, during playback, the magnetic head of the apparatus reaches a specific zone or zones in the track of the magnetic sheet where the predetermined frequency is prerecorded. The playback operation is automatically suspended upon production of the stop signal from the generator circuit. Such a zone may be arranged, for example, after each prerecorded piece of audio information in which the instructor raises a question and calls for an answer from the student. It is possible in this manner to make utmost use of a limited period of recording time as the playback operation is held suspended while the student considers the question and finds his answer. This type of presentation of information is also effective in language study.

The above and other objects, features and advantages of this invention and the manner of attaining them will become more apparent, and the invention itself will best be understood, by reference to the following description of a preferred embodiment, taken in conjunction with the accompanying drawings in which like reference characters denote like parts throughout.

DESCRIPTION OF THE PREFERRED EMBODIMENT

General Organization

Figure 1:
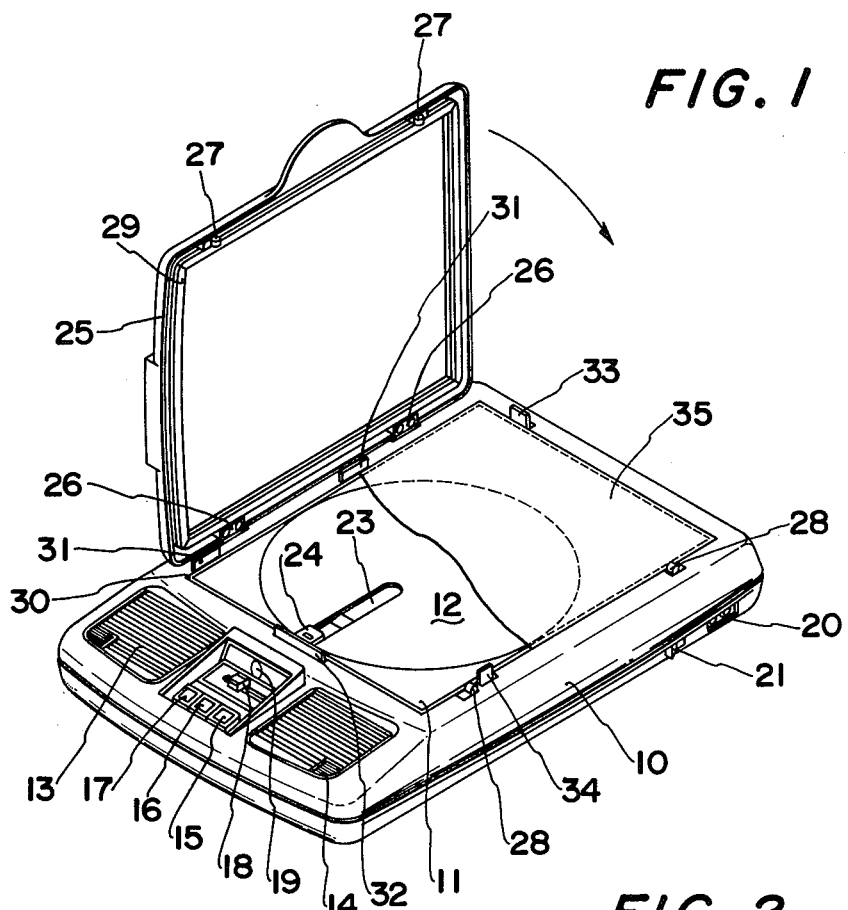
FIG. 1 is a perspective view of a magnetic sheet recording and reproducing machine to which is applied the electric control system according to this invention, in which the magnetic sheet is shown partly broken away to reveal the part of the machine lying thereunder.

The electric control system according to the invention is well adaptable for magnetic sheet recording and reproducing apparatus of the type illustrated in FIG. 1 of the accompanying drawings. The illustrated recording and reproducing machine for audio-visual teaching purposes has a casing 10 of generally flat, rectangular configuration. The casing 10 has a platform 11 on which a magnetic sheet is to be replaceably mounted. Arranged substantially centrally of the platform 11 is a turntable 12 which is rotatable relative to the platform and which is arranged flush therewith.

On the top of the casing 10, on one side of the platform 11, a loudspeaker 13 and microphone 14 are arranged with a spacing therebetween. The loudspeaker and microphone are both built into the machine and are protectively covered by their respective jackets as in the drawing. Between the loudspeaker 13 and microphone 14 there are a row of pushbutton switches 15, 16 and 17, a slide-rule-type volume control 18, and a pilot lamp 19. The switch 15 is the PLAY switch for initiating the recording or playback operation of the machine, 16 is the STOP switch; and 17 is the BACK switch for causing the backward or reverse rotation of a drive motor (not shown in FIG. 1) for backspacing purposes, as will be later described in greater detail.

On one lateral face of the casing 10 there are provided a plug receptacle 20 and on-off power switch 21 in the adjacency of each other. Although unseeable in FIG. 1, two other pushbutton switches are assumed to be provided to the casing. One is a recording (REC) switch to be actuated simultaneously with the PLAY switch 15 to initiate recording operation. The other is a record-playback mode selector switch to selectively set the electric circuitry of the machine, which is later described, in the recording or playback mode.

The turntable 12 has a radial guide slot 23, and a magnetic recording/reproducing head 24 projects upwardly therethrough. During playback or recording operation the magnetic head 24 will move along the guide slot 23 from its illustrated outermost starting position toward the center of the turntable 12, in step with the rotation of the turntable relative to the platform 11, thereby following the spiral magnetic track on the rear face of the rectangular magnetic sheet 35 placed in position over the platform. After following the track to its end, the magnetic head 24 will return to the starting position by traveling linearly back along the guide slot 23. The drive mechanism including the drive motor for causing such movement of the magnetic head can be of any known or suitable construction.

A rectangular holder frame 25 is hinged at 26 to the casing 10 for securely holding the magnetic sheet 35 in position over the platform 11 during playback or recording operation. The holder frame 25 has a pair of fastener members 27 which are capable of resilient engagement with a corresponding pair of fastener members 28 on the casing 10 when the holder frame is closed over the top of the casing.

Preferably, the holder frame 25 is provided with beveled inner edges 29 in interfitting relationship to bevels 30 bounding the platform 11. Thus, when the holder frame 25 is closed over the casing 10, with the magnetic sheet 35 placed over the platform 11, the marginal edges of the magnetic sheet will be caught between the bevels 29 and 30, so that the sheet is held in position against any possibility of displacement.

For positioning the magnetic sheet 35 over the platform 11, a pair of stop members 31 are fixedly mounted on the casing 10 along one of the longer sides of the platform, and another stop member 32 is fixedly mounted on one of the shorter sides of the platform. On the other shorter sides of the platform 11 there is arranged a positioning member 33 which is spring-biased toward the stop member 32, and another positioning member 34 on the other longer side of the platform is likewise spring-biased toward the pair of stop members 31. As the magnetic sheet 35 is deposited on the platform 11, therefore, the sheet will be resiliently pressed against the stop members 31 and 32 by the positioning members 33 and 34 and will thus be readjusted to its precise predetermined position over the platform.

As is well known, there are printed on the top or front face of the magnetic sheet 35, the characters, pictures, diagrams, tables, photographs, tables and other forms of visual information corresponding to the audio information stored in the magnetic track on its rear face. With this magnetic sheet placed and held in position over the platform 11 of the casing 10, therefore, the student can reproduce the audio information therefrom and, where desired, record his own voice thereon to learn the subject matter on an audiovisual basis.

ELECTRIC CIRCUITRY

Figure 2:
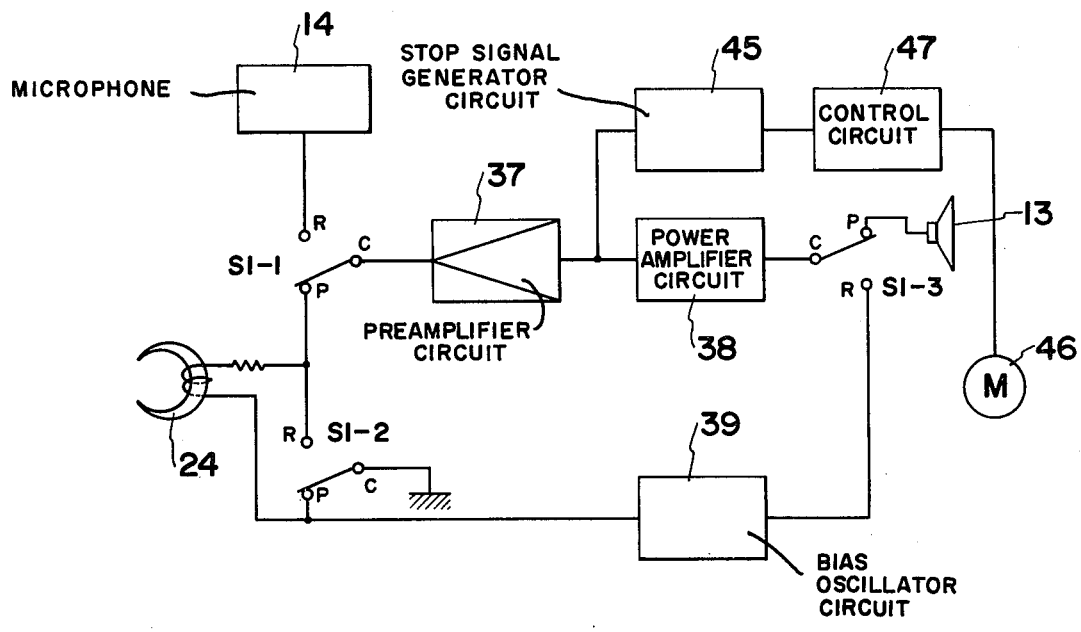
FIG. 2 is a block diagram of the electric circuitry of the magnetic sheet recording and reproducing machine of FIG. 1.

FIG. 2 illustrates the overall electric circuit configuration of the above described magnetic sheet recording and reproducing machine. The electric circuitry comprises the loudspeaker 13, microphone 14 and magnetic head 24, which are all set forth above in connection with FIG. 1, and a preamplifier circuit 37, power amplifier circuit 38, and bias oscillator circuit 39.

Three contact sets S1-1, S1-2 and S1-3 also included in the circuitry are ganged together to be simultaneously operated from the aforesaid record/playback mode selector switch. When the movable contacts C of the three contact sets are closed to the respective fixed contacts P, the machine is set in the playback mode as then a playback circuit is completed which comprises the magnetic head 24, preamplifier circuit 37, power amplifier circuit 38, and loudspeaker 13. When the movable contacts C are closed to the other fixed contacts R, on the other hand, the recording mode is established with the completion of a recording circuit comprising the microphone 14, preamplifier circuit 37, power amplifier circuit 38, bias oscillator circuit 39, and magnetic head 24.

AUTOMATIC STOP SIGNAL GENERATOR

Shown at 45 in the block diagram of FIG. 2 is an automatic stop signal generator circuit which produces an output stop signal in response to an input signal of a predetermined frequency. Such an input signal is supplied when, during playback, the magnetic head 24 reaches a specific zone or zones in the spiral track of the magnetic sheet 35 where the said predetermined frequency is prerecorded. The playback operation is to be automatically suspended upon production of the stop signal from the circuit 45, as will be more fully understood from the following description.

Figure 3:
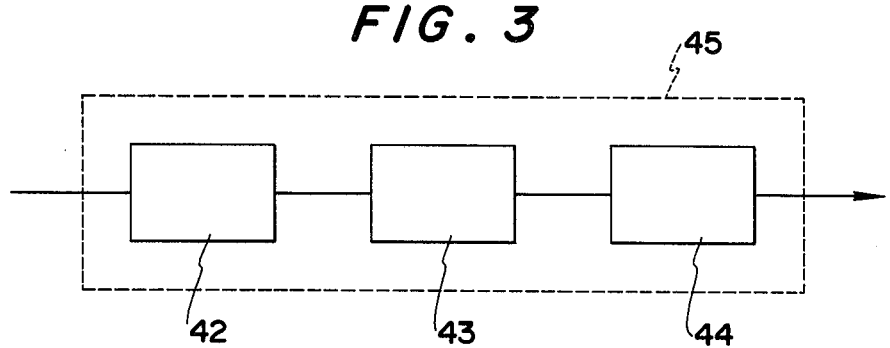
FIG. 3 is a block diagram of the automatic stop signal generator circuit incorporated with the circuitry of FIG. 2.

With reference to FIG. 3 the automatic stop signal generator circuit 45 in this particular embodiment of the invention is shown to comprise a filter circuit 42, an AC to DC inverter circuit 43, and a time constant circuit 44. In consideration of the recording and reproducing characteristics with the use of magnetic sheets as the recording medium, the predetermined frequency should, for the best results, be made as low as about 45 Hz. The time constant circuit 44 is adapted to use the 45 Hz signal as the desired stop signal in distinction from other audio frequency signals.

Thus, when the magnetic head 24 reaches the specific track zone where the 45 Hz signal is prerecorded, this signal is amplified by the preamplifier circuit 37 and is delivered to the automatic stop signal generator circuit 45. The filter circuit 42 is designed to permit the passage therethrough of the 45 Hz signal and to block other audio frequency signals picked up by the magnetic head 24. The output from the filter circuit 42 is changed to the direct current by the inverter circuit 43, and the time constant circuit 44 selects the desired DC signal having a predetermined time constant. The DC output signal from the circuit 44 is utilized as the automatic stop signal in the manner hereinafter made apparent.

CONTROL CIRCUIT

With reference again to FIG. 2 the automatic stop signal generator circuit 45 is connected to a control circuit 47 for control of the operation of the magnetic sheet recording and reproducing machine in accordance with the novel concepts of the invention.

Figure 4:
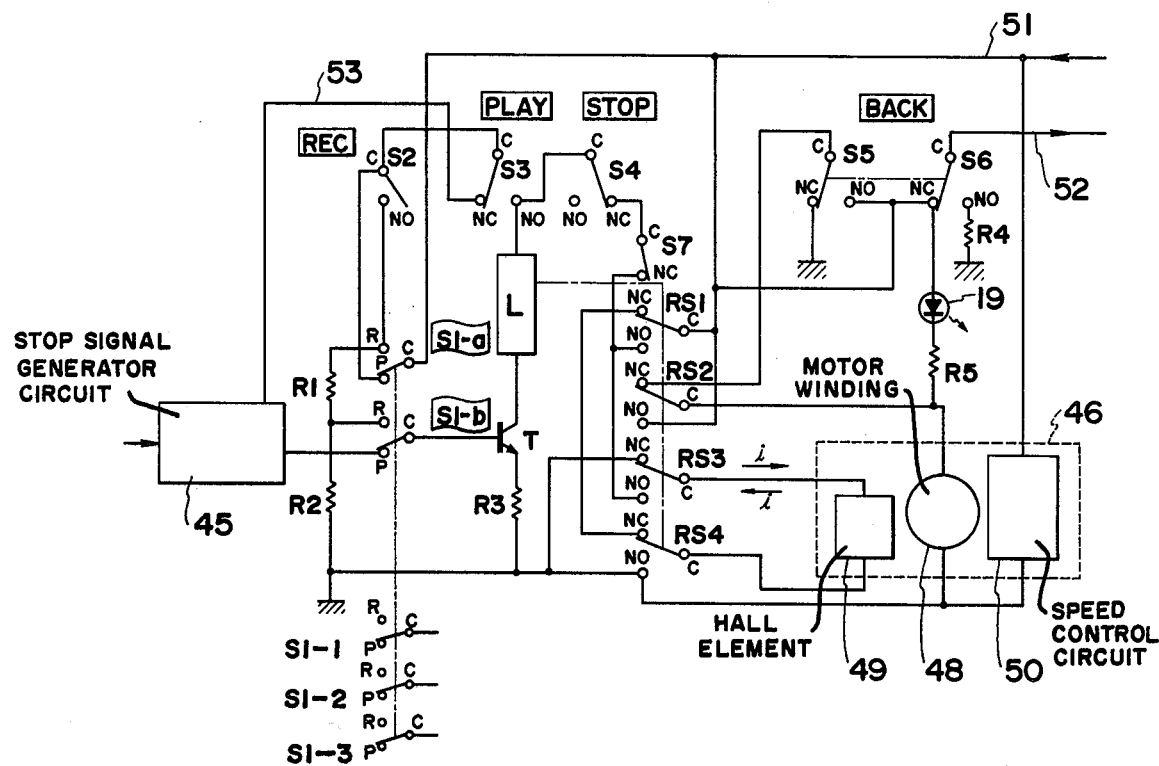
FIG. 4 is a schematic electrical diagram showing in detail a preferred form of the control circuit according to the invention, the control circuit being also incorporated with the circuitry of FIG. 2.

As illustrated in detail in FIG. 4, the control circuit 47 comprises: (1) PLAY circuit means for causing the reversible drive motor 46 to rotate in its forward direction at a predetermined constant speed for playback or recording operation; (2) STOP circuit means for manually stopping the rotation of the drive motor in its forward direction; (3) BACK circuit means for setting the drive motor in and out of rotation in the backward or reverse direction for backspacing of the magnetic head; (4) double recording prevention circuit means for automatically stopping the rotation of the drive motor upon accidental actuation of the record-playback mode selector switch during recording or playback; (5) automatic motor stop circuit means for stopping the rotation of the drive motor during playback in response to the stop signal from the automatic stop signal generator circuit; (6) completion switch means for automatically stopping the forward rotation of the drive motor by mechanically sensing the return of the magnetic head to the predetermined starting position on the magnetic sheet upon completion of playback or recording operation; (7) brake means for electromagnetically braking the drive motor when the same is to be set out of rotation in its forward or reverse direction; (8) muting switch means for automatically making the machine incapable of recording and playback operations during drive motor rotation in the reverse direction; and (9) circuit means for causing the pilot lamp 19 to light up when the on-off switch 21 is turned on.

The REC switch, PLAY switch 15, STOP switch 16 and BACK switch 17 set forth in connection with FIG. 1 are shown at S2, S3, S4 and S5, respectively, in the control circuit of FIG. 4. The BACK switch S5 is ganged with a muting switch or contact set S6. Contact sets S1-a and S1-b are operated simultaneously with the aforesaid contact sets S1-1 to S1-3 by the record-playback mode selector switch. A contact pair S7 constitutes a completion switch which is actuated automatically when the magnetic head 24 returns to the starting position on the magnetic sheet 35 upon completion of playback or recording operation.

The movable contacts C of all the switches or contact sets S2 to S7 listed in the preceding paragraph are of spring-return type, normally held in touch with the fixed contacts NC (or out of touch with the fixed contact NO in the case of the REC switch S2) and closed to the fixed contacts NO (or moved away from the fixed contact NC in the case of the completion switch S7) only during application of operating pressure.

A relay L is associated with four relay contact sets RS1 to RS4. The relay contact set RS1 is designed to open and close a holding circuit of the relay L. The relay contact set RS2 is designed to open and close a motor feed circuit. The relay contact sets RS3 and RS4 coact to change the direction of rotation of the reversible drive motor 46.

A transistor T has its base connected to the output of the automatic stop signal generator circuit 45 via the record-playback mode selector switch contact set S1-b, so that upon delivery of the DC stop signal therefrom during playback operation, the transistor will be rendered nonconductive to open the holding circuit of the relay L. This transistor is also rendered nonconductive during actuation of the selector switch contact set S1-b.

The pilot lamp 19 in this electrical diagram is shown as a light emitting diode. Also considered from a purely electrical viewpoint, the drive motor 46 is shown to comprise a motor winding 48, a Hall element 49 coacting with the relay contact sets RS3 and RS4 to change the direction of rotation of the drive motor, and a conventional speed control circuit 50. The reference numeral 51 represents the B or positive supply line of this control circuit; 52 a B supply line connected to the circuit comprising the preamplifier 37 and power amplifier 38 of FIG. 2; and 53 an inhibit line extending between the automatic stop signal generator circuit 45 and the fixed contact NC of the PLAY switch S3.

PLAYBACK

For playback the record-playback mode selector switch may be manually actuated to close the movable contacts C of all the ganged contact sets S1-1 to S1-3, S1-a and S1-b to the fixed contacts P, thereby setting the entire electric circuitry of the machine in the playback mode. The PLAY switch S3 must also be manually actuted to temporarily close its movable contact C to the fixed contact NO, whereupon the relay L becomes connected to the positive supply line via the PLAY switch S3 and mode selector switch contact set S1-a.

Upon consequent energization of the relay L the movable contacts C or all the relay contact sets RS1 to RS4 become closed to the fixed contacts N0. With the movable contact of the relay contact set RS1 closed to the fixed contact NO the relay can be held energized via the completion switch S7 and STOP switch S4 even after the movable contact of the PLAY switch S3 has returned to the fixed contact NC. The relay contact set RS2 completes the motor feed circuit from the positive supply line 51 to the motor winding 48, and as the movable contacts of the relay contact sets RS3 and RS4 are also closed to the fixed contacts NO, a current flows through the Hall element 49 in such a direction as to cause the drive motor to rotate in the forward direction.

It is understood that a high level output is now delivered from the automatic stop signal generator circuit 45 to hold the transistor T conductive. The magnetic head 24 of the machine shown in FIG. 1 may be located just on the predetermined frequency zone on the track of the magnetic sheet 35 when the PLAY switch S3 is actuated. Even in this case the autmotic stop signal generator circuit 45 can be prevented from producing the stop signal because the inhibit line 53 is held disconnected from the positive supply line 51 as long as the PLAY switch S3 is held actuated. The transistor T can thus be held conductive regardless of whether the magnetic head is located on the predetermined frequency zone or not at the start of playback operation.

The forward rotation of the drive motor 46 terminates when the holding circuit of the relay L is opened with the resultant de-energization of the relay. This can be accomplished either when: (1) the STOP switch S4 is manually opened; (2) the completion switch S7 is automatically opened; or (3) the automatic stop signal is supplied from the circuit 45 to the transistor T to terminate conduction therethrough. Upon de-energization of the relay L the motor winding 48 becomes short-circuited via the relay contact set RS2 and BACK switch S5 thereby functioning as the electromagnetic brake.

RECORDING

For recording operation the record-playback mode selector switch must first be actuated to close the movable contacts of all its ganged contact sets to the fixed contacts R. With the machine thus set in the recording mode the REC switch S2 and PLAY switch S3 may then be simultaneously actuated to close their movable contacts to the fixed contacts NC. The relay L is energized from the positive supply line 51 via the selector switch contact set S1-*a*, REC switch S2 and PLAY switch S3. As the relay contact sets RS1 to RS4 are resultantly actuated, the drive motor 46 is caused to rotate in the forward direction as in the above described playback operation.

It will be understood that the transistor T can be held conductive throughout the subsequent recording operation by a pair of resistors R1 and R2. These resistors are designed to prevent the transistor from being rendered nonconductive by the frequency components of the automatic stop signal which may be applied during the recording operation.

The recording operation can be terminated either by manually actuating the STOP switch S4 or upon automatic actuation of the completion switch S7, through exactly the same procedure as that previously explained in conjunction with the playback operation.

BACKSPACING

For backspacing the magnetic head 24 with respect to the magnetic sheet 35, the BACK switch S5 may be manually actuated to cause the drive motor 46 to rotate in the reverse direction. With the movable contact C of the BACK switch thus closed to the fixed contact NO the positive supply line 51 is connected to the motor winding 48 via the BACK switch and relay contact set RS2. Since the relay L remains unenergized upon actuation of the BACK switch S5, the polarity of the connections of the Hall elements 49 is opposite to that during playback or recording operation, so that the drive motor rotates in the reverse direction.

As long as the BACK switch S5 is held actuated, the movable contact C of the muting contact set S6 is held closed to the fixed contact NO to disconnect the preamplifier circuit 37, power amplifier circuit 38 and so forth from their positive supply line 52. The muting contact set S6 thus functions to make the machine incapable of the recording or playback function during drive motor rotation in the reverse direction. This reverse rotation of the drive motor can be terminated as the BACK switch S5 is released. A resistor R4 is for the discharge of a capacitor, not shown, that is connected in the subsequent stage of the muting contact set S6.

The student may, either erroneously or intentionally, actuate the record-playback mode selector switch during drive motor rotation in its forward direction, that is, during the travel of the magnetic head along the track on the magnetic sheet for playback or recording operation. In this case the mode selector switch contact set S1-*b* terminates conduction through the transistor T as its movable contact C moves from the fixed contact P to R, or vice versa, so that the relay L becomes de-energized to set the drive motor out of rotation. It is possible in this manner to preclude the possibility of double recording or of accidental erasure of the recorded information. The pilot lamp 19 is lit up upon closure of the power switch and remains unlit during motor rotation.

Although not illustrated, a circuit for changing the rotation speed of the drive motor may be derived from the motor speed control circuit and associated with the PLAY switch or BACK switch for the "fast forward" or "fast backward" control of the magnetic head. This and other modifications of the invention which will readily occur to the specialists are intended in the foregoing disclosure. The invention, therefore, should be construed broadly and in a manner consistent with the scope of the following claims.

What is claimed is:

1. An apparatus for recording and reproducing audio information on and from a stationary magnetic sheet, wherein a magnetic head is driven by an electric drive motor to follow a track on the magnetic sheet for recording or playback, wherein said track on said magnetic sheet includes a zone where a signal of a predetermined frequency is prerecorded, an electric control system comprising, in combination:

electric power supply means for running said electric drive motor; magnetic head mounting means guiding said head for movement along said track in either direction upon rotation of said electric drive motor;

first switch means for setting said drive motor in rotation in one direction thereby driving said head along said track in one direction for recording or playback;

second switch means for terminating the rotation of said drive motor in said one direction;

a relay energized upon actuation of said first switch means;

a holding circuit being closed upon initial energization of said relay to hold said relay energized, said holding circuit being opened upon actuation of said second switch means to de-energize said relay;

relay contact means actuated upon energization of said relay to connect said drive motor from said electric power supply means for rotation in said one direction, said drive motor being set out of rotation upon de-energization of said relay;

an automatic stop signal generator circuit which produces an output signal in response to detection of said signal of a predetermined frequency prerecorded in a zone of said track on said magnetic sheet;

circuit means for de-energizing said relay in response to said output signal from said automatic stop signal generator circuit;

third switch means for setting said drive motor in rotation in the direction opposite to said one direction, said drive motor being caused to rotate in said opposite direction via said relay contact means during actuation of said third switch means thereby driving said head along said track in the opposite direction to said one direction;

said drive motor having a winding means functioning as an magnetic brake by being short-circuited when said drive motor is set out of rotation;

muting switch means that is ganged with said third switch means to make the apparatus incapable of recording and playback operations during rotation of said drive motor in said opposite direction.

2. The electric control system as recited in claim 1, wherein said circuit means includes a transistor for opening said holding circuit in response to said output signal from said automatic stop signal generator circuit.

3. The electric control system as recited in claim 2, wherein said automatic stop signal generator circuit comprises:

a filter circuit for permitting the passage therethrough of said signal of said predetermined frequency;

an inverter circuit for changing the output from said filter circuit into a DC signal; and a time constant circuit for deriving from the output from said inverter circuit a DC stop signal to be impressed to said transistor.

4. The electric control system as recited in claim 1, wherein said predetermined frequency is about 45 Hz.

5. The electric control system as recited in claim 1, including selector switch means connected between said automatic stop signal generator circuit and said circuit means to permit the output signal from the former to be applied to the latter only during playback operation.

6. The electric control system as recited in claim 1, including inhibit means for preventing the production of the output signal from said automatic stop signal generator circuit in event the magnetic head is located on said zone at the start of playback operation.

7. The electric control system as recited in claim 1, wherein said second switch means comprises a stop switch which is actuated manually, and a completion switch which is actuated automatically upon completion of recording or playback operation.

8. The electric control system as recited in claim 1, wherein said drive motor is of reversible type.

9. The electric control system as recited in claim 1, wherein said drive motor is provided with a Hall element connected to said relay contact means so as to be reversed in the polarity of its connections by said relay for changing the direction of rotation of said drive motor, whereby said drive motor is caused to rotate in said one direction upon actuation of said first switch means with the consequent energization of said relay, and in said opposite direction during actuation of said third switch means with no consequent energization of said relay.

* * * * *